US 9,373,958 B2

(12) United States Patent
Sivakumar et al.

(10) Patent No.: US 9,373,958 B2
(45) Date of Patent: Jun. 21, 2016

(54) CONTROL TECHNIQUES FOR PHOTOVOLTAIC POWER PLANTS

(75) Inventors: Seshadri Sivakumar, Austin, TX (US); Jiyong Lian, Austin, TX (US)

(73) Assignee: SunPower Corporation, San Jose, CA (US)

( * ) Notice: Subject to any disclaimer, the term of this patent is extended or adjusted under 35 U.S.C. 154(b) by 1127 days.

(21) Appl. No.: 13/427,729

(22) Filed: Mar. 22, 2012

(65) Prior Publication Data
US 2013/0250635 A1 Sep. 26, 2013

(51) Int. Cl.
H02J 1/00 (2006.01)
H02J 3/38 (2006.01)
H02J 3/18 (2006.01)

(52) U.S. Cl.
CPC . *H02J 3/383* (2013.01); *H02J 3/18* (2013.01); Y02E 10/563 (2013.01); Y02E 40/30 (2013.01)

(58) Field of Classification Search
CPC .......... H02J 3/383; H02J 3/18; Y02E 10/563; Y02E 40/30
USPC .......................................................... 307/82
See application file for complete search history.

(56) References Cited

U.S. PATENT DOCUMENTS

| 7,579,716 | B2 * | 8/2009 | Sato ................... G03G 15/5004 219/216 |
| 7,923,862 | B2 | 4/2011 | Cardinal et al. |
| 7,979,167 | B2 | 7/2011 | Delmerico et al. |
| 7,990,743 | B2 | 8/2011 | Walling et al. |
| 2002/0075701 | A1 | 6/2002 | Hubert et al. |
| 2006/0171182 | A1* | 8/2006 | Siri ................... H02M 3/33592 363/131 |
| 2006/0245221 | A1* | 11/2006 | Ohshima ........... H02M 7/53871 363/131 |
| 2008/0195255 | A1 | 8/2008 | Lutze et al. |
| 2009/0316447 | A1* | 12/2009 | Kim .......................... G05F 1/67 363/37 |
| 2010/0052425 | A1 | 3/2010 | Moore et al. |
| 2010/0067271 | A1 | 3/2010 | Garces et al. |
| 2010/0114397 | A1* | 5/2010 | Cardinal ................. H02J 3/383 700/297 |
| 2010/0138061 | A1 | 6/2010 | Walling et al. |
| 2010/0207456 | A1 | 8/2010 | Lasseter et al. |
| 2010/0277218 | A1* | 11/2010 | Schill ........................ H02J 7/35 327/427 |
| 2011/0264289 | A1 | 10/2011 | Sawyer et al. |
| 2012/0326511 | A1 | 12/2012 | Johnson |

OTHER PUBLICATIONS

PCT International Search Report and Written Opinion of the International Searching Authority for Application No. PCT/US2012/068982, Apr. 26, 2013, 11 sheets.

* cited by examiner

Primary Examiner — Jared Fureman
Assistant Examiner — Alfonso Perez Borroto
(74) Attorney, Agent, or Firm — Okamoto & Benedicto LLP

(57) ABSTRACT

A photovoltaic power plant includes solar cells and inverters that convert direct current generated by the solar cells to alternating current. The reactive powers generated by the inverters are based on a reactive power generated by a virtual inverter. The virtual inverter has an equivalent impedance representing the impedances of the inverters in the photovoltaic power plant. The reactive power setpoints of the inverters may be received from a local interpreter. The local interpreter may generate the reactive power setpoints from a global reactive power setpoint generated by a grid controller.

5 Claims, 9 Drawing Sheets

CONTROL TECHNIQUES FOR PHOTOVOLTAIC POWER PLANTS

TECHNICAL FIELD

Embodiments of the subject matter described herein relate generally to solar cells. More particularly, embodiments of the subject matter relate to operation and control of photovoltaic power plants.

BACKGROUND

Photovoltaic power plants employ solar cells to convert solar radiation to electrical energy. Photovoltaic power plants also include photovoltaic inverters ("inverters"), which convert direct current (DC) generated by the solar cells to alternating current (AC) suitable for delivery to a point of interconnect (POI) with a utility grid through a network of transformers and transmission lines.

The role of inverters in supporting grid integration requirements in the context of large photovoltaic power plants is still evolving. While utility grade inverters, due to their topology and controllability, offer extended capabilities, such as controlled reactive power delivery, frequency-power droop control, and fault-ride-through, practical challenges associated with coordinated control of multiple inverters operating in parallel in a large photovoltaic power plant have not been fully explored or understood. Inverters are highly flexible and controllable devices, but they are only capable of responding to conditions present at their terminals. In addition, a large photovoltaic plant contains multiple, distributed inverter stations, typically with non-identical circuit impedances and dynamic characteristics. As the inverters used in a large photovoltaic power plant may be procured from multiple vendors, several of their key parameters, such as active and reactive power ratings, output over-voltage tolerance, and control response rates, may be highly diverse between inverter stations. The distances of the inverters to the POI with the utility grid and the limitations in sensing of signals at the POI impose additional constraints on the communication infrastructure and on the achievable control response rates.

BRIEF SUMMARY

In one embodiment, a method of controlling operation of a photovoltaic power plant includes providing a plurality of solar cells. A plurality of inverters converts direct current generated by the solar cells to alternating current, each of the plurality of inverters generates reactive power in accordance with an input reactive power setpoint. A grid controller generates a global reactive power setpoint. A plurality of interpreters receives the global reactive power setpoint. Each of the plurality of interpreters converts the global reactive power setpoint to a reactive power setpoint for a particular group of inverters in the plurality of inverters, and provides the reactive power setpoint to the particular group of inverters.

In another embodiment, a method of controlling operation of a photovoltaic power plant includes determining an equivalent impedance representing impedances of a plurality of inverters of the photovoltaic power plant. A reactive power generated by a virtual inverter having the equivalent impedance is determined. A reactive power contribution of each inverter in the plurality of inverters is determined based on the reactive power generated by the virtual inverter. For each inverter in the plurality of inverters, a reactive power setpoint of the inverter is set using the determined reactive power contribution of the inverter. Each inverter in the plurality of inverters generates reactive power based on its reactive power setpoint.

In another embodiment, a method of controlling operation of a photovoltaic power plant includes dividing an impedance network of the photovoltaic power plant into a plurality of first level inverter clusters, each of the first level inverter clusters representing a plurality of inverters of the photovoltaic power plant. An equivalent impedance of each of the first level inverter clusters, representing impedances of inverters represented in each of the first level inverter clusters, is determined. Equivalent impedances of the first level inverter clusters are grouped into second level inverter clusters. An equivalent impedance of a super inverter cluster is determined based at least on the equivalent impedances of the first level inverter clusters and the second level inverter clusters, the equivalent impedance of the super inverter cluster representing impedances of inverters represented in the first level inverter clusters. A reactive power generated by a virtual inverter having the equivalent impedance of the super inverter cluster is determined. A reactive power contribution of each of the inverters represented in the first level inverter clusters is determined based on the reactive power generated by the virtual inverter. An inverter represented in the first level inverter clusters generates a reactive power in accordance with a reactive power contribution determined for the inverter.

These and other features of the present invention will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
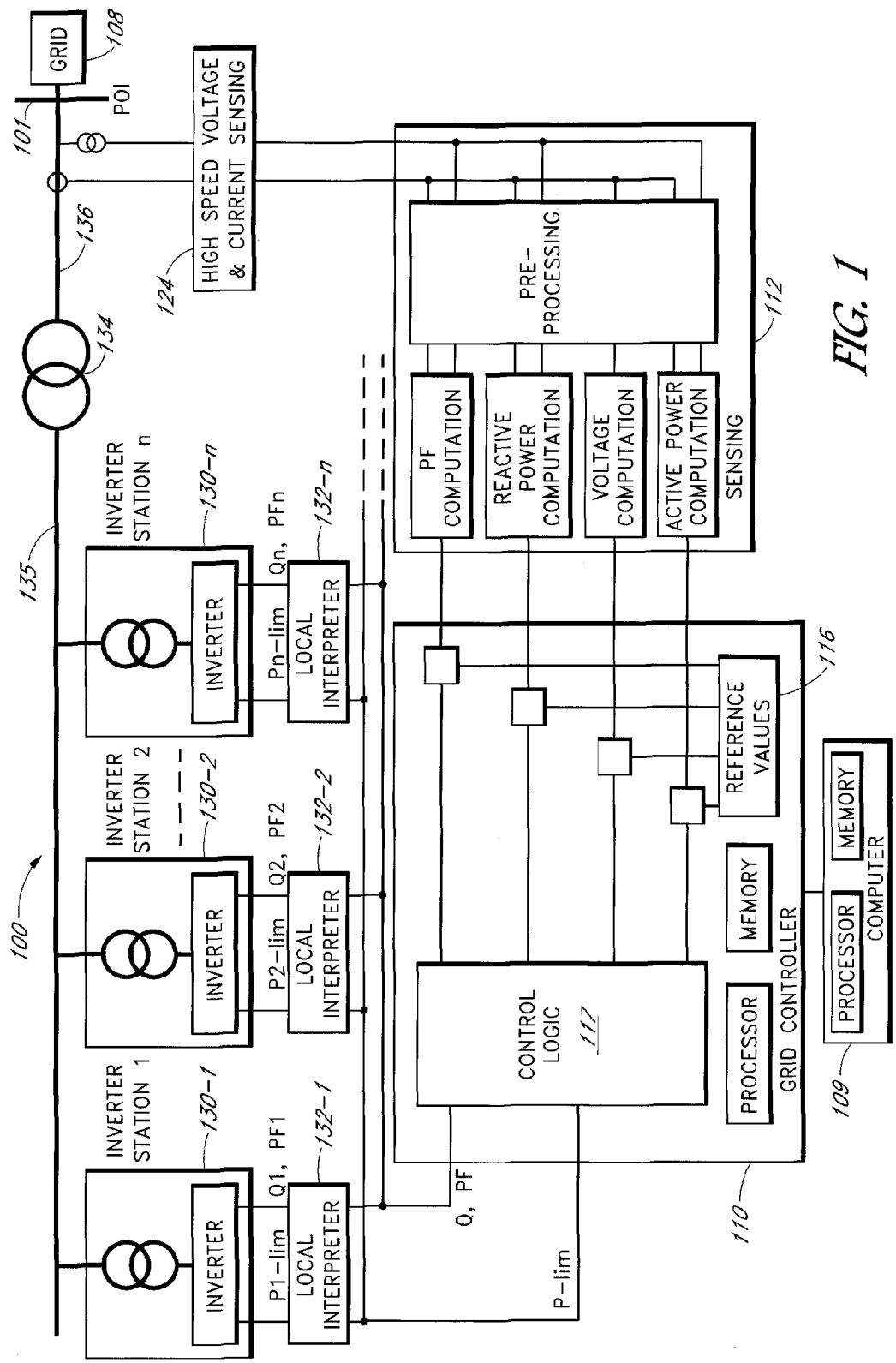
FIG. 1 is a schematic diagram of a photovoltaic power plant in accordance with an embodiment of the present invention.

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

In general, the generic optimal reactive power scheduling problem for a large photovoltaic power plant can be described as follows. For an appropriately chosen midpoint node where all clusters of inverters are connected, given a set of midpoint nodal variables $v_m(k)$ and $q_m(k)$, and inverter variables: $p_i(k)$, $i=1,2,\ldots,N$, compute $Q_i(k)$, $i=1,2,\ldots,N$, which minimizes a selected objective function $J(k)$, under the constraint that $$|q_i(k)| \le q_{imax}(k) \qquad (EQ. 1)$$

where $q_{imax}(k)$, the reactive power limit of inverter i, is dependent largely on the capability of the inverters, and typically on the VA power capacity $S_{imax}$, and the operating power $p_i(k)$. For example, for inverters capable of providing reactive power limited by the limit on the operating power factor, $q_{imax}(k)$ is given by:

$$q_{imax}(k) = \begin{cases} S_{imax}\sin\left[\cos^{-1}\left(\frac{p_i(k)}{S_{imax}}\right)\right], & \text{for } pf_{imax} \le \frac{p_i(k)}{S_{imax}} \le 1 \\ S_{imax}\sin[\cos^{-1}(pf_{imax})], & \text{for } 0 \le \frac{p_i(k)}{S_{imax}} \le pf_{imax} \end{cases} \qquad (EQ. 2)$$

where, $pf_{imax}$ is the inverter's maximum power factor at full rated VA power.

Alternatively, for inverters capable of providing reactive power limited by operating power factor only, $$q_{imax}(k) = S_{imax}\sin\left[\cos^{-1}\left(\frac{p_i(k)}{S_{imax}}\right)\right], \text{ for } 0 \le \frac{p_i(k)}{S_{imax}} \le 1 \qquad (EQ. 3)$$

An example objective function is given by $$j(k) = \Sigma_{i=1}^{N}(|v_m(k)| - |v_i(k)|)^2 \qquad (EQ. 4)$$

for which the optimization process results in the computation of desired reactive powers for all inverters that collectively ensures that the inverter terminal voltages are as close as possible to the mid-point voltage. It is to be noted that the optimal values of the inverter reactive powers are computed for each operating point k, and since the number of operating points may be large, for practical viability, the results will need to be combined and consolidated to obtain a concise solution, such as through an inverter clustering process of its own, taking into account the distribution of the desired reactive powers obtained for various operating points.

The generic solution path for the optimization process described above may be complex, in particular, for large photovoltaic power plants with a large number of inverters or inverter clusters. Described below is a tractable solution path that uses a binary-tree inverter clustering model, wherein first the individual inverters (or the lowest-level inverter clusters) of the entire photovoltaic power plant are grouped together, the resulting inverter clusters in turn are grouped together, and the process is continued until a single inverter cluster is obtained. Note that the optimization process can be extended to other inverter clustering models such as trinary-tree, quarternary-tree and so on.

Referring now to FIG. 1, there is shown a schematic diagram of a photovoltaic power plant 100 in accordance with an embodiment of the present invention. In the example of FIG. 1, the photovoltaic power plant 100 comprises a computer 109, a grid controller 110, a sensing module 112, voltage and current sensors 124, photovoltaic inverter stations 130 (i.e., 130-1, 130-2, . . . , 130-n), and local interpreters 132 (i.e., 132-1, 132-2, . . . , 132-n).

Figure 2:
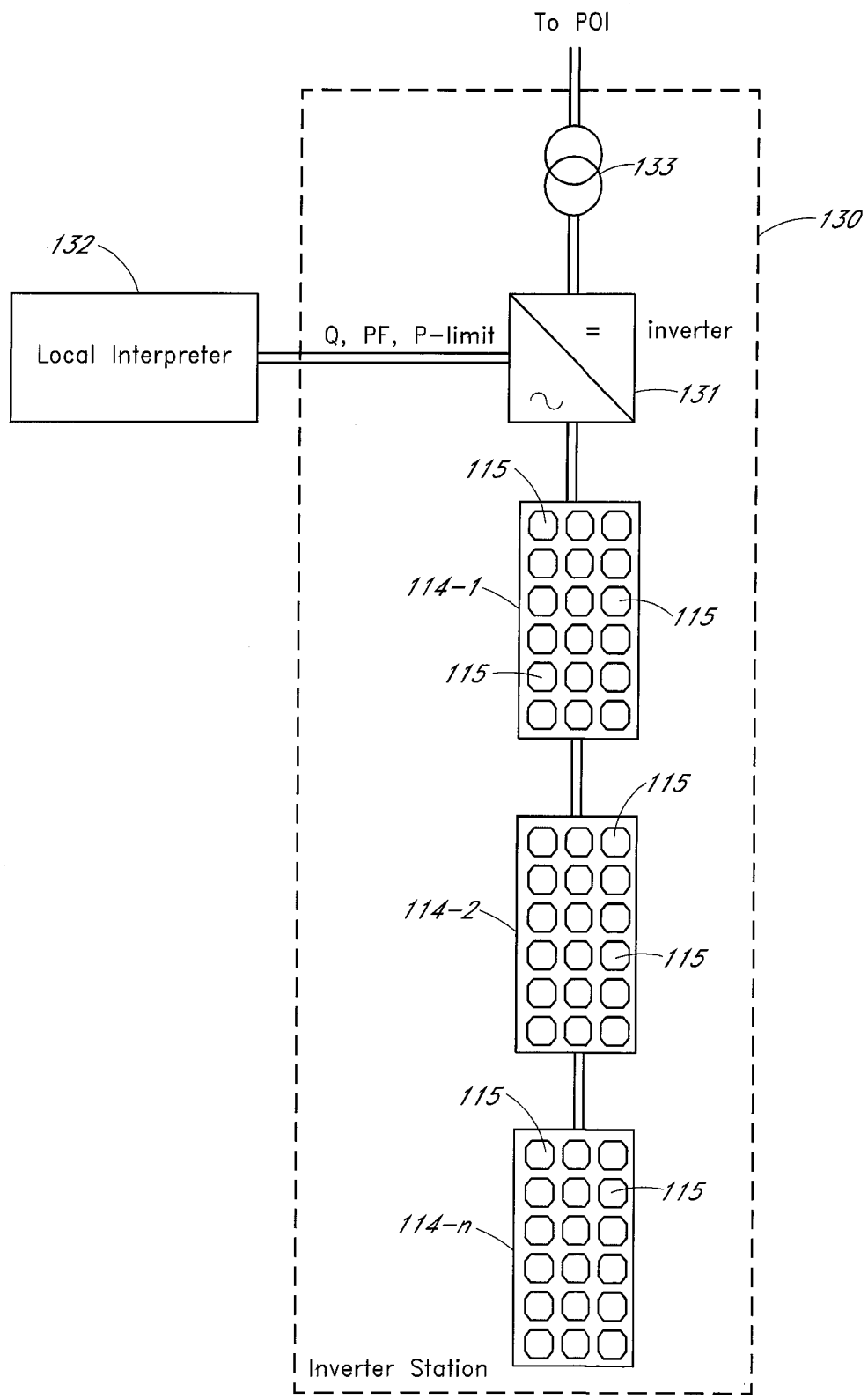
FIG. 2 is a schematic diagram showing further details of the photovoltaic power plant of FIG. 1 in accordance with an embodiment of the present invention.

As shown in FIG. 2, an inverter station 130 may include one or more photovoltaic inverters 131, a plurality of photovoltaic modules 114 (i.e., 114-1, 114-2, . . . , 114-n), and a transformer 133. Typically, there is more than one inverter 131 in an inverter station 130 but only one is shown in FIG. 2 for clarity of illustration. A local interpreter 132 sends control signals in the form of reactive power (Q) setpoint, power factor (PF) setpoint, and/or active power limit (P-limit) to one or more inverters 131 of an inverter station 130.

A photovoltaic module 114 may include a plurality of solar cells 115. It is to be noted that only some of the solar cells 115 have been labeled in FIG. 2 for clarity of illustration. The solar cells 115 convert solar radiation into electrical energy. An inverter 131 converts direct current (DC) generated by the solar cells 115 into alternating current (AC), and a transformer 133 steps up the AC output voltage of the inverter 131 to a level suitable for delivery to a point of interconnection (POI) 101. As shown in FIG. 1, the stepped up AC output voltage of an inverter 131 may be coupled to a utility grid 108 through a network comprising a second level transformer 134, cables or transmission lines 135 connecting inverter station transformers 133 to the second level transformer 134, and transmission lines 136 connecting the second level transformer 134 to the POI 101.

Referring to FIG. 1, the voltage and current sensors 124 may comprise meters that measure voltage and current at the POI 101. The sensing module 112 receives the voltage and current measurements from the voltage and current sensors 124. The sensing module 112 may include a pre-processing module (e.g., filters) to condition the voltage and current measurements. The sensing module 112 may further include computation modules to process the pre-processed voltage and current measurements to determine the power factor, reactive power, voltage, and active power (also known as "real power") at the POI 101. In contrast to inverters 131 in the inverter stations 130, which measure conditions at their terminals, the sensing module 112 detects power factor, reactive power, voltage, and active power at the POI 101. This allows for more accurate detection of conditions at the POI, eliminating sensing problems due to transmission losses.

The computer 109 may comprise a desktop computer, laptop computer, workstation, or other computing device. In one embodiment, the computer 109 includes modeling and analysis software, which may be in a memory (e.g., RAM) for execution by a processor. The modeling and analysis software may comprise a math software package, such as MATLAB™, PSSE™, MATCHCAD™, and/or PSLF™ software tool. The computer 109 may be configured to perform computation to determine optimum reactive power setpoints for inverters 131 in the inverter stations 130. The optimized reactive power setpoints may be provided from the computer 109 to the grid controller 110 and/or the local interpreters 132 over a computer network or by removable computer-readable storage medium (e.g., USB stick, CD, DVD), for example. Depending on the computing resources of the grid controller 110, the functionality of the computer 109 may also be implemented in the grid controller 110.

The grid controller 110 may be configured to maintain specified reactive power at the POI 101, and/or set a limit on the global active power production at the POI 101. In one embodiment, the grid controller 110 receives the power factor, reactive power, voltage, and active power values at the POI 101 from the sensing module 112, compares these values to reference values 116, and adjusts through a control logic module 117 the global reactive power setpoint (Q), or global power factor (PF) setpoint, and global active power limit (P-limit) sent to the inverter stations 130 such that the inverters 131 in the inverter stations 130 output voltage and current to achieve the specified reactive power and active power levels at the POI 101. The aforementioned setpoints and limit are global in that they are intended for all of the inverters 131 in the photovoltaic power plant 100.

A reactive power setpoint is a command to an inverter 131 to generate an output current that achieves the reactive power indicated by the reactive power setpoint. That is, an inverter 131 generates reactive power in accordance with the reactive power setpoint provided to that inverter 131. Similarly, the power factor setpoint is a command to the inverter 131 to generate an output current that achieves the power factor indicated by the power factor setpoint. Generally speaking, an active power delivered from an inverter 131 is based on the output of the solar cells 115. However, the grid controller 110 can set a limit on total active power production below the available total real power from the solar cells 115. Also, generally speaking, the power factor setpoint and the reactive power setpoint are dependent on each other, and only one of these is selected depending on a selected mode of operation, while the other is dictated by the former. The grid controller 110 generates the global reactive power setpoint, or power factor setpoint, based on available power output from the solar cells 115, or in some cases, adjusts the global active power limit to accommodate additional global reactive power that may be required to meet POI reactive power requirements.

In the embodiment of FIG. 1, the grid controller generates a single, global reactive power setpoint (Q) or power factor setpoint (PF), and active power limit (PF-limit) for all the inverters 131 in the inverter stations 130. As will be more apparent below, an optimized reactive power setpoint may be determined for each inverter 131 or each group of similar inverters 131. To implement this optimization, a local interpreter 132 may receive the global reactive power set point or global power factor setpoint, and global active power limit from the grid controller 110 and convert these global values to local values for use by all inverters 131 in a particular inverter station 130. For example, the local interpreter 132 may scale, or add a bias value to, the global reactive power setpoint to a same or similar level as the optimized reactive power setpoint for the corresponding inverter station 130. Each local interpreter 132 may receive the scaling and the biasing factors or the optimized reactive power setpoint for inverters 131 of a particular inverter station 130 from the grid controller 110 or from the computer 109 over a computer network, by manual configuration, by removable computer-readable storage medium etc. The scaled reactive power setpoint or power factor setpoint, and active power limit are provided by the local interpreter 132 to inverters 131 in the corresponding inverter station 130. The local interpreters 132 may be implemented as an electrical circuit, programmed logic, or some other device.

Figure 3:
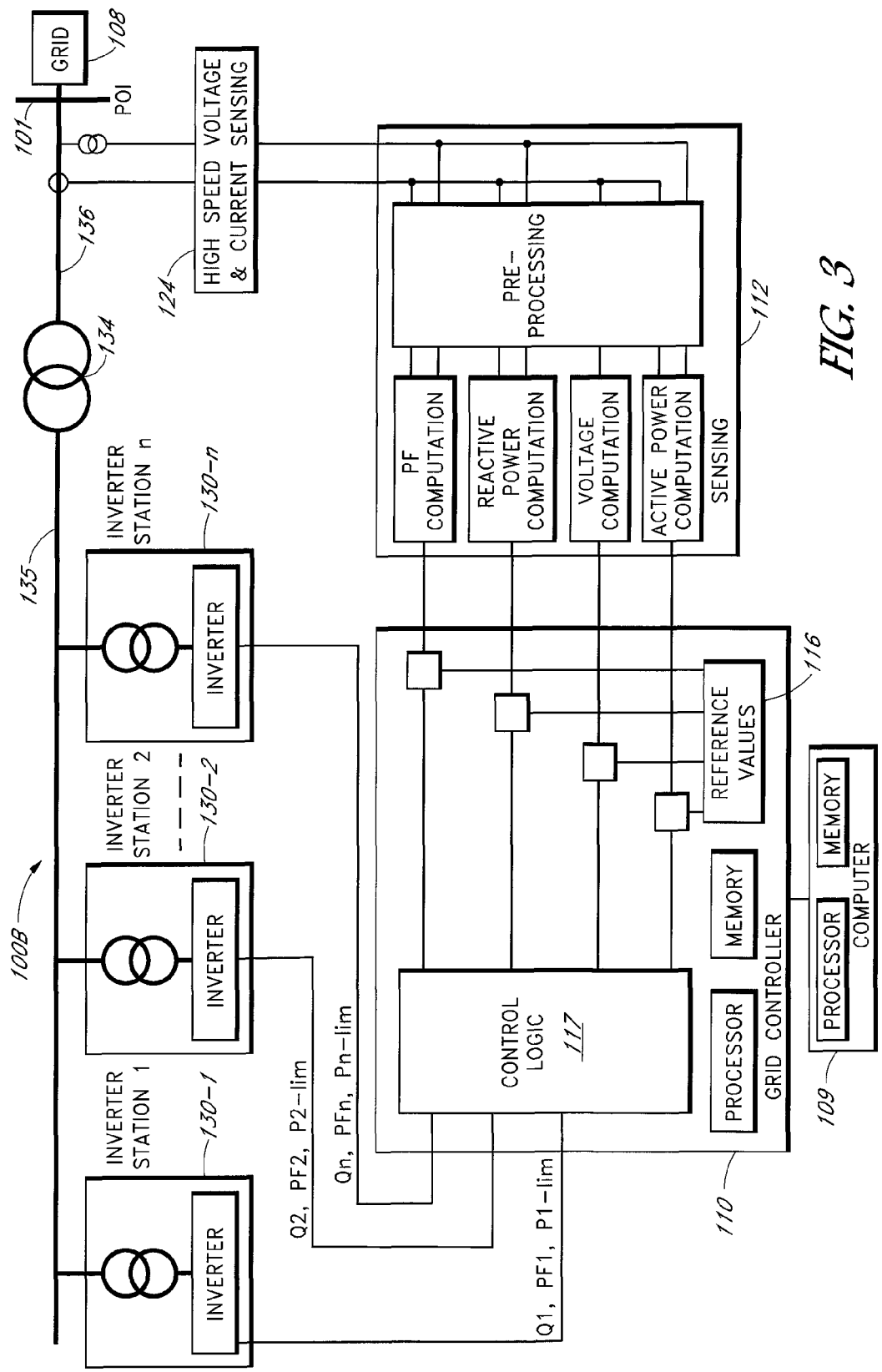
FIG. 3 is a schematic diagram of a photovoltaic power plant in accordance with another embodiment of the present invention.

The use of local interpreters 132 advantageously allows embodiments of the present invention to be deployed in pre-existing photovoltaic power plants by simply inserting a local interpreter 132 between a grid controller and each inverter station. It is to be noted, however, that the functionality of the local interpreters 132 may also be incorporated within the grid controller 110. For example, the grid controller 110 may also output separate optimized reactive power setpoint, power factor setpoint, and active power limit for each inverter station 130, rather than sending a single, global value for all inverter stations 130. This embodiment is schematically illustrated in FIG. 3, which shows a photovoltaic power plant 100B. The photovoltaic power plant 100B is the same as the photovoltaic power plant 100 except that the grid controller 110 generates separate optimized reactive power setpoint (Q1, Q2, . . . , Qn), power factor setpoint (PF1, PF2, . . . , PFn) and active power limit (P1-lim, P2-lim, . . . , Pn-lim) for each inverter station 130. The components and operation of the photovoltaic power plant 100B are otherwise the same as those of the photovoltaic power plant 100.

Figure 4:
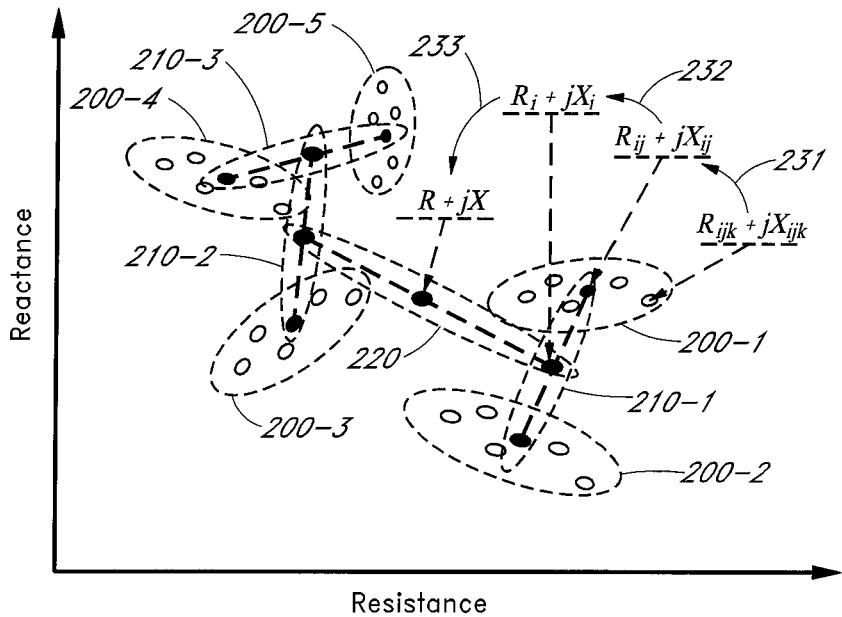
FIG. 4 is an impedance map of a photovoltaic power plant, illustrating a method of clustering a plurality of inverters to generate a single virtual inverter having an impedance that represents the impedances of the plurality of inverters, in accordance with an embodiment of the present invention.
Figure 5:
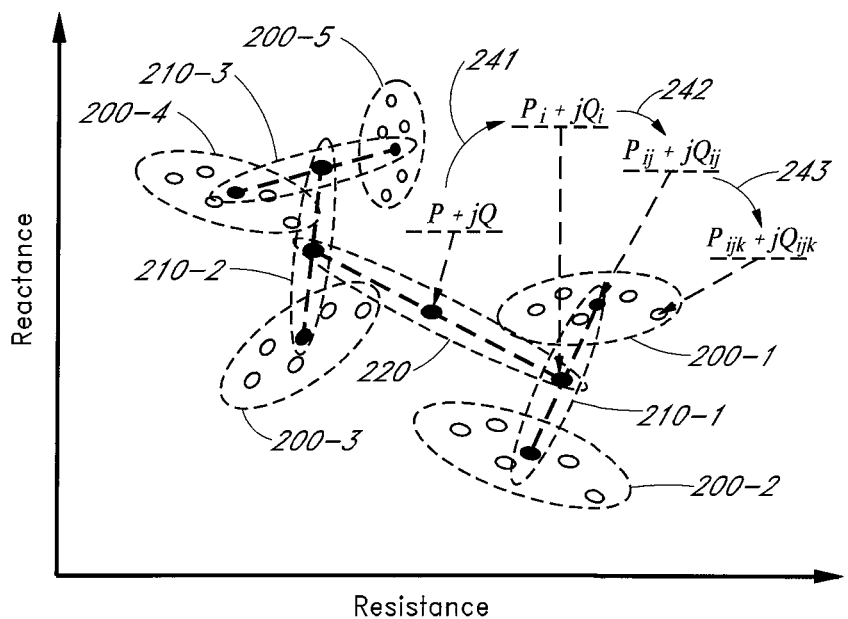
FIG. 5 is the impedance map of FIG. 4 relabeled to illustrate a method of generating an optimized reactive power setpoint for each of a plurality of inverters of a photovoltaic power plant, in accordance with an embodiment of the present invention.

FIGS. 4 and 5 show an impedance map of the photovoltaic power plant 100, with the vertical axis representing reactance (X) and the horizontal axis representing resistance (R). The impedance map of FIG. 4 is labeled to illustrate a method of clustering a plurality of inverters 131 to generate a single virtual inverter having an impedance that represents the impedances of the plurality of inverters 131 in accordance with an embodiment of the present invention. In the example of FIG. 4, the impedance of an inverter 131 refers to the line impedance of the inverter 131, which comprises the output impedance of the inverter 131, the impedance of a first-level transformer 133 connected to the inverter 131, and the impedance of the cables and the transmission lines 135 up to the next junction node where multiple inverter stations 130 are connected. As in other large photovoltaic power plants, the inverters 131 of the photovoltaic power plant 100 may come from different vendors and may have different impedances. Also, the first-level transformers 133 and the cables and transmission lines 135 may have significantly different impedances. These impedances of the output of an inverter 131 are taken into account in the clustering process for more accuracy.

In the example of FIG. 4, an inverter clustering approach is employed to generate an equivalent impedance that represents the overall electrical network in the photovoltaic power plant 100, as seen from the point of interconnection (POI) up to the point where all the inverters 131 are represented by a single "virtual" aggregate inverter with a single line impedance. At the lowest inverter clusters, the inverters represented in a cluster are actual inverters 131. At the next higher level inverter cluster and following higher level inverter clusters, the inverters in a cluster are "virtual" inverters (as opposed to physical inverters) in that they provide representative inverters for modeling and analysis purposes only.

In the example of FIG. 4, the impedance network of the photovoltaic power plant 100 is divided into a plurality of first level inverter clusters 200 (i.e., 200-1, 200-2, 200-3, 200-4, 200-5). A first level inverter cluster 200 is a lowest level inverter cluster in this example. Accordingly, each first level inverter cluster 200 comprises a grouping of inverters 131 (as opposed to virtual inverters) having similar line impedance levels. For example, each first level inverter cluster 200 may be a grouping of inverters 131 of inverter stations 130 in a single feeder network, or inverters 131 of inverter stations 130 of different feeder networks but having similar line impedance levels. In the example of FIG. 4, each hollow dot in a first level inverter cluster 200 represents a single inverter 131 having a line impedance that is mathematically described by $R_{ijk}+jX_{ijk}$, where $R_{ijk}$ is the resistance component of the line impedance and $X_{ijk}$ is the reactance component of the line impedance of the inverter 131. It is to be noted that in the example of FIG. 4, the subscript k stands to denote the first level inverter clusters, the subscript j stands to denote the second level inverter clusters, and the subscript i stands to denote the third level inverter cluster. It is to be noted that a photovoltaic power plant may have several levels of inverter clusters, but only three levels are described here for clarity of illustration. A first level inverter cluster 200 may comprise a grouping of multiple inverters 131 but only a few inverters 131 are represented in each first level inverter cluster 200 as shown in FIG. 4 for clarity of illustration.

In the example of FIG. 4, an equivalent impedance representing all of the line impedances of the inverters 131 in a first level inverter cluster 200 is represented by a solid dot and is mathematically described by $R_{ij}+jX_{ij}$. In one embodiment, an equivalent impedance representing all of the line impedances of the inverters 131 in a first level inverter cluster 200 may be calculated using a weighted averaging technique, taking into account the power rating of the individual inverters 131, which includes associated transformers, cables, etc. In the example of FIG. 4, an arrow 231 indicates the calculation of an equivalent impedance $R_{ij}+jX_{ij}$ of a first level inverter cluster 200-1 from the impedance $R_{ijk}+jX_{ijk}$ of each individual inverters 131 represented in the first level inverter cluster 200-1. An equivalent impedance is calculated for all first level inverter clusters 200. Each of the first level inverter clusters 200 may be treated as being represented by a single virtual inverter having an equivalent impedance, which represents all of the line impedances of the inverters 131 belonging to that first level inverter cluster 200.

The above described inverter clustering and impedance calculation process is repeated until the entire impedance network of the photovoltaic power plant 100 is simplified into a single super cluster, which represents a single virtual inverter having a single equivalent impedance. In the example of FIG. 4, the first level inverter clusters 200 are further grouped into second level inverter clusters 210 (i.e., 210-1, 210-2, 210-3). Each second level inverter cluster 210 may comprise first level inverter clusters 200 having similar equivalent impedances. An equivalent impedance representing all of the equivalent impedances of first level inverter clusters 200 in a second level inverter cluster 210 is then calculated. The equivalent impedance of a second level inverter cluster 210 may be calculated in the same manner as the calculation of the equivalent impedance of a first level inverter cluster 200. In the example of FIG. 4, a virtual inverter of a second level inverter cluster 210 is represented by a solid dot and has an equivalent impedance that is mathematically described by $R_i+jX_i$. The equivalent impedance of a second level inverter cluster 210 represents all of the impedances of virtual inverters in the second level inverter cluster 210. An arrow 232 indicates the calculation of the equivalent impedance $R_i+jX_i$ of a second level inverter cluster 210-1 from the equivalent impedance $R_{ij}+jX_{ij}$ of a first level inverter cluster 200-1 and a first level inverter cluster 200-2, which are grouped together to form the second level inverter cluster 210-1. An equivalent impedance is calculated for all second level inverter clusters 210.

The above-described process is further repeated by grouping the equivalent impedances of the second level inverter clusters 210 into next higher level inverter clusters until only a single inverter cluster remains. In the example of FIG. 4, the next higher level inverter cluster is a super inverter cluster 220, which is the only remaining inverter cluster in this example. It is to be noted that a photovoltaic power plant may have several levels of inverter clusters, but only three levels are described here for clarity of illustration. The super inverter cluster 220 represents a virtual inverter having an equivalent impedance representing all of the impedances of virtual inverters in the super inverter cluster 220. In the example of FIG. 4, the virtual inverter represented by the super inverter cluster 220 is shown as a solid dot and has an equivalent impedance that is mathematically described by impedance R+jX. The equivalent impedance of the super inverter cluster 220 may be calculated in the same manner as the calculation of the equivalent impedance of lower level inverter clusters. In the example of FIG. 4, an arrow 233 indicates the calculation of the equivalent impedance R+jX of the super inverter cluster 220 from the impedance $R_i+jX_i$ of a second level inverter cluster 210-1 and a second level inverter cluster 210-2. In this example, the equivalent impedance of the super inverter cluster 220 represents the line impedance of all inverters 131 and the overall electrical network of the photovoltaic power plant 100. All of the impedances calculated in the inverter clustering process are retained.

FIG. 5 shows the impedance map of the photovoltaic power plant 100 as in FIG. 4. The first level inverter clusters 200, second level inverter clusters 210, and the super inverter cluster 220 have been discussed with reference to FIG. 4.

FIG. 5 has been labeled to illustrate a method of generating an optimized reactive power setpoint for each of the inverters 131 based on the virtual inverter of the super inverter cluster 220, in accordance with an embodiment of the present invention.

As can be appreciated, the equivalent impedance of the super inverter cluster 220 may be treated as the impedance of a single virtual inverter representing all of the inverters 131 and the overall electrical network in the photovoltaic power plant 100. In the example of FIG. 5, the equivalent impedance of the super inverter cluster 220, i.e., the impedance of the virtual inverter represented by the super inverter cluster 220, is employed to calculate the reactive power requirement, corresponding active power, and operating voltage for each operating point at the POI 101. The resulting reactive power (Q) and active power (P) at the POI 101 as output by the virtual inverter of the super inverter cluster 220 is mathematically described by P+jQ. The reactive power needed to be generated by the virtual inverter of the super inverter cluster 220 is then distributed among individual virtual inverters represented in the super inverter cluster 220. That is, each individual virtual inverter represented in the super inverter cluster 220 contributes reactive power that collectively meets the reactive power needed to be generated by the virtual inverter represented by the super inverter cluster 220 for a corresponding operating point at the POI 101. An active power that corresponds to each reactive power contribution is also calculated. In the example of FIG. 5, each individual virtual inverter represented in the super inverter cluster 220 contributes $P_i+jQ_i$ powers. In the example of FIG. 5, an arrow 241 indicates calculation of reactive power contribution, and corresponding active power, of individual virtual inverters represented in the super inverter cluster 220.

The distribution of reactive power generation among individual virtual inverters of lower level inverter clusters is continued until the reactive power contribution of each inverter 131 is determined. In the example of FIG. 5, each second level inverter cluster 210 may be thought of as having an overall virtual inverter that is expected to generate reactive power and active power mathematically described by $P_i+jQ_i$, i.e., the contribution of an individual virtual inverter represented in the super inverter cluster 220. The reactive power needed to be generated by the overall virtual inverter of the second level inverter cluster 210 is then distributed among individual virtual inverters represented in the second level inverter cluster 210. That is, each individual virtual inverter represented in the second level inverter cluster 210 contributes reactive power to meet the reactive power needed from the overall virtual inverter of the second level inverter cluster 210. An active power that corresponds to the reactive power contribution is also calculated. In the example of FIG. 5, each individual virtual inverter represented in the second level inverter cluster 210 contributes $P_{ij}+jQ_{ij}$ powers. In the example of FIG. 5, an arrow 242 indicates calculation of reactive power contribution, and corresponding active power, of individual virtual inverters represented in a second level inverter cluster 210-1. The reactive power contribution and corresponding active power of each individual virtual inverter in other second level inverter clusters 210 are also calculated.

Finally, the reactive power contribution of each inverter 131 of inverter stations 130 represented in each first level inverter cluster 200 is calculated from the virtual inverter of the first level inverter cluster 200. In the example of FIG. 5, each first level inverter cluster 200 may be treated as having a virtual inverter that is expected to generate reactive power and active power mathematically described by $P_{ij}+jQ_{ij}$ i.e., the contribution of an individual virtual inverter represented in the second level inverter cluster 210. The reactive power needed to be generated by the overall virtual inverter of the first level inverter cluster 200 is then distributed among the inverters 131 represented in the first level inverter cluster 200. That is, each individual inverter 131 represented in the first level inverter cluster 200 contributes reactive power to meet the reactive power needed from the overall virtual inverter of the first level inverter cluster 200. The reactive power contribution of an individual inverter 131 is optimized and may be used as the reactive power setpoint for that inverter 131. An active power limit that corresponds to the reactive power contribution is also calculated for each inverter 131. In the example of FIG. 5, each inverter 131 of inverter stations 130 represented in the first level inverter cluster 210 contributes $P_{ijk}+jQ_{ijk}$ powers. In the example of FIG. 5, an arrow 243 indicates calculation of reactive power contribution, and corresponding active power, of each inverter 131 included in the first level inverter cluster 200-1. The reactive power contribution and corresponding active power of each inverter 131 in other first level inverter clusters 200 are also calculated. The reactive power contribution calculated for an inverter 131 may be used as the reactive power setpoint of that inverter 131.

Figure 6:
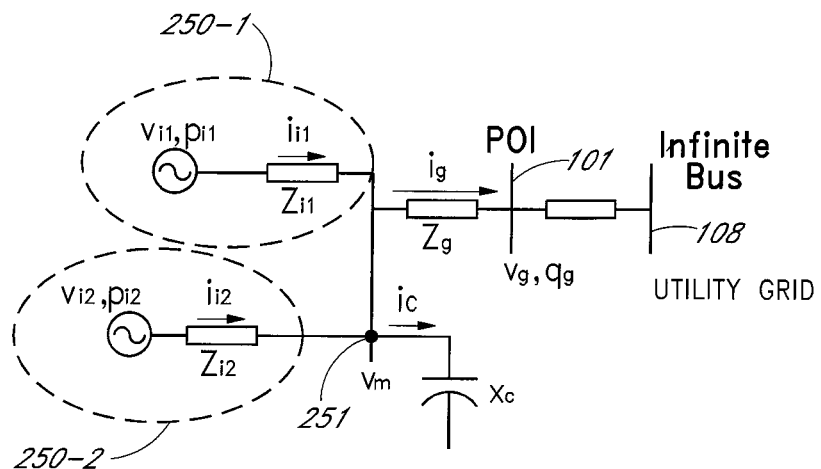
FIG. 6 is a schematic diagram that further explains the inverter clustering process of FIG. 4 in accordance with an embodiment of the present invention.

FIG. 6 is a schematic diagram that further explains the inverter clustering process of FIG. 4 in accordance with an embodiment of the present invention. FIG. 6 includes a simple binary-tree inverter cluster system, where two inverter clusters 250 (i.e., 250-1, 250-2) are obtained through a binary-tree inverter clustering process. Each of the inverter clusters 250 is a first level inverter cluster in this example. It is assumed that the equivalent impedances of the inverter clusters 250 seen from the midpoint node 251 differ from each other significantly and the power ratings of inverters represented by the two inverter clusters 250 are not necessarily identical.

In the example of FIG. 6, $v_g$ represents the voltage variable at the POI 101, $q_g$ represents the reactive power variable at the POI 101, $v_m$ represents the nodal voltage variable at the midpoint node 251 where the inverter clusters 250 are connected, $v_{i1}$ and $v_{i2}$ represent the terminal voltage variables of inverters 131 represented in the inverter clusters 250, $i_{i1}$ and $i_{i2}$ are the current variables from the inverters 131 represented in the inverter clusters 250, $i_g$ is the variable representing the current flowing into the utility grid 108 from the inverter clusters 250, $i_c$ is the variable representing current through the switched capacitor represented by $X_c$, $Z_g$ is the impedance between the POI 101 and the midpoint node 251, $Z_{i1}$ and $Z_{i2}$ are the impedances between the midpoint node 251 and inverters 131. Also, $p_{i1}$ and $p_{i2}$ are the variables representing the active powers generated by the inverters 131. It is further noted that the impedances $Z_{i1}$, $Z_{i2}$ and, $Z_{i1}$ and $Z_g$ are typically of the form $Z_x=R_x+jX_x$, where $R_x$ is the resistive component and $X_x$ is the inductive reactive component of the impedance $Z_x$.

From FIG. 6, $$v_m = v_g + Z_g i_g \qquad (EQ.\ 5)$$

$$v_{i1} = v_m + Z_{i1} i_{i1} \qquad (EQ.\ 6)$$

$$v_{i2} = v_m + Z_{i2} i_{i2} \qquad (EQ.\ 7)$$

Figure 7:
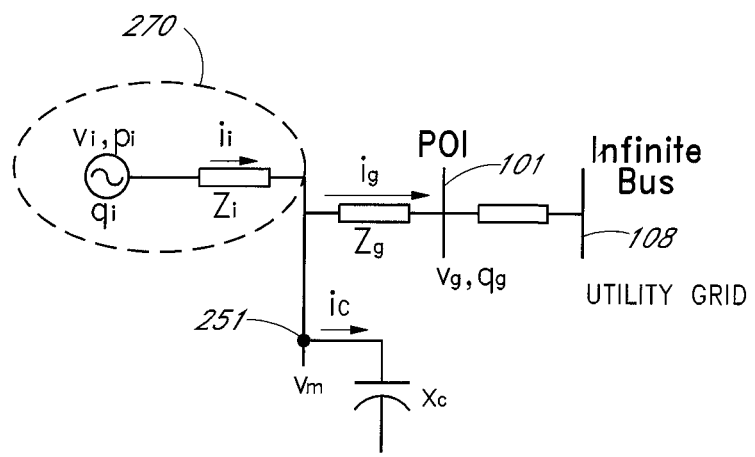
FIG. 7 is a schematic diagram of an equivalent circuit of a photovoltaic power plant having inverters that are combined into a single super inverter cluster, in accordance with an embodiment of the present invention.

FIG. 7 shows the equivalent circuit of the photovoltaic power plant 100, with the inverter clusters 250 combined into a single super inverter cluster 270, in accordance with an embodiment of the present invention. In the example of FIG. 7, $i_i = i_{i1} + i_{i2}$ represents the total current from the inverters 131 of the inverter clusters 250, and $$Z_i = \frac{Z_{i1} Z_{i2}}{Z_{i1} + Z_{i2}} \qquad (EQ.\ 8)$$

is the equivalent Thevenin impedance of the inverter clusters 250 as seen from the midpoint node 251. It is to be noted that, $p_i(k) \approx p_{i1}(k) + p_{i2}(k)$, assuming power losses at the inverter clusters 250 are negligible.

Given a set of operating requirements $|v_g(k)| = V_g(k)$, and $q_g(k) = Q_g(k)$ at the POI 101, and $p_i(k) = P_i(k)$ at the super inverter cluster 270, where k represents the operating point, a load flow computation may be performed to determine the corresponding operating variables $v_m(k)$, $i_c(k)$, $i_i(k)$ and $v_i(k)$ using the following equations:

$$|v_g(k)| = V_g(k) \qquad (EQ.\ 9)$$

$$v_m(k) = v_g(k) + Z_g i_g(k) \qquad (EQ.\ 10)$$

$$v_i(k) = v_m(k) + Z_i i_i(k) \qquad (EQ.\ 11)$$

$$P_i(k) = Re\{v_i(k) i_i^*(k)\} \qquad (EQ.\ 12)$$

$$Q_g(k) = q_g(k) = -Im\{v_g(k) i_g^*(k)\} \qquad (EQ.\ 13)$$

where $i_i^*(k)$ and $i_g^*(k)$ represent the complex conjugates of $i_i(k)$ and $i_g(k)$, respectively. The load flow computation may be performed using an appropriate non-linear equations solver, such as the Newton-Raphson method or equivalent method available from software tools, such as MATLAB™, PSSE™ or PSLF™ software tools, for example.

Now, the reactive power generated by the overall virtual inverter of the super inverter cluster 270 is computed as $$q_i(k) = Im\{v_i(k)i_i^*(k)\} \quad \text{(EQ. 14)}$$

Given $v_i(k)$ and $q_i(k)$ corresponding to the single inverter cluster 270 of FIG. 7, an optimal distribution of reactive power contribution among the individual inverter clusters 250 may be determined through an optimization method. First, the limits on the reactive power available from and allowable imbalances between inverter clusters 250 are established as follows:

$$|q_{i1}(k)| \leq Q_{i1max}(k), \quad \text{(EQ. 15)}$$

$$|q_{i2}(k)| \leq Q_{i2max}(k), \quad \text{(EQ. 16)}$$

where, $q_{i1}(k)$ and $q_{i2}(k)$ are the reactive powers of the two individual inverter clusters 250 to be determined, $Q_{i1max}(k)$ and $Q_{i2max}(k)$ are the limits of the reactive power available from the inverter clusters 250. Representing $\Delta q_i(k)$ as the reactive power differential to be determined between the inverter clusters 250, we write $$q_{i1}(k) = Im\{v_{i1}(k)i_{i1}^*(k)\} = q_i(k) + \Delta q_i(k) \quad \text{(EQ. 17)}$$

$$q_{i2}(k) = Im\{v_{i2}(k)i_{i2}^*(k)\} = q_i(k) - \Delta q_i(k) \quad \text{(EQ. 18)}$$

where, $$|\Delta q_i(k)| \leq \Delta Q_{imax}(k) \quad \text{(EQ. 19)}$$

where $\Delta Q_{imax}(k)$ is the allowable limit on the reactive power differential $\Delta q_i(k)$.

Next, the active powers $P_{i1}(k)$ and $P_{i2}(k)$ that can be extracted from the inverter clusters 250 are established and fixed using the prevailing power production capability of the inverter clusters 250 and the solar cells 115 of the photovoltaic power plant 100. It is to be noted that $$P_i(k) = P_{i1}(k) + P_{i2}(k) \quad \text{(EQ. 20)}$$

The active powers of the inverter clusters 250 are related to their voltage and current variables by:

$$P_{i1}(k) = p_{i1}(k) = Re\{v_{i1}(k)i_{i1}^*(k)\} \quad \text{(EQ. 21)}$$

$$P_{i2}(k) = p_{i2}(k) = Re\{v_{i2}(k)i_{i2}^*(k)\} \quad \text{(EQ. 22)}$$

The next step is to compute an optimal value of the reactive power differential $\Delta q_i(k)$ between the inverter clusters 250 and the corresponding inverter currents $i_{i1}(k)$ and $i_{i2}(k)$ that minimizes the voltage magnitude error between the super inverter cluster 270 and the individual sub inverter clusters 250 using the following objective function $$j(k) = \{|v_i(k)| - |v_{i1}(k)|\}^2 + \{|v_i(k)| - |v_{i2}(k)|\}^2 \quad \text{(EQ. 23)}$$

while simultaneously satisfying equations EQ. 15 through EQ. 22 above. The above problem can be solved through standard non-linear optimization techniques available through software tools, such as the MATLAB™ software tool, for example.

Next, using the reactive power differential obtained above, the optimal reactive power contributions for the individual inverter clusters 250 are obtained using equations EQ. 17 and EQ. 18, and the corresponding voltage and current variables $\{v_{i1}(k), v_{i2}(k), i_{i1}(k), i_{i2}(k)\}$ are computed in addition using equations EQ. 6, EQ. 7, EQ. 21, and EQ. 22. The process is repeated for lower level inverter clusters until the optimal reactive power contributions of individual inverters (or inverters in the lowest inverter clusters) are determined. The results of the optimization can be verified through a reverse load-flow study performed on the entire network. If required, further refinements to optimization can be performed through an iterative process comprising the computation of the optimal reactive power contribution of individual inverters followed by a reverse load-flow study, wherein the results of an iteration step are used to update the variables for the next iteration step, and the process continued until the results converge within a tolerance band.

Figure 8:
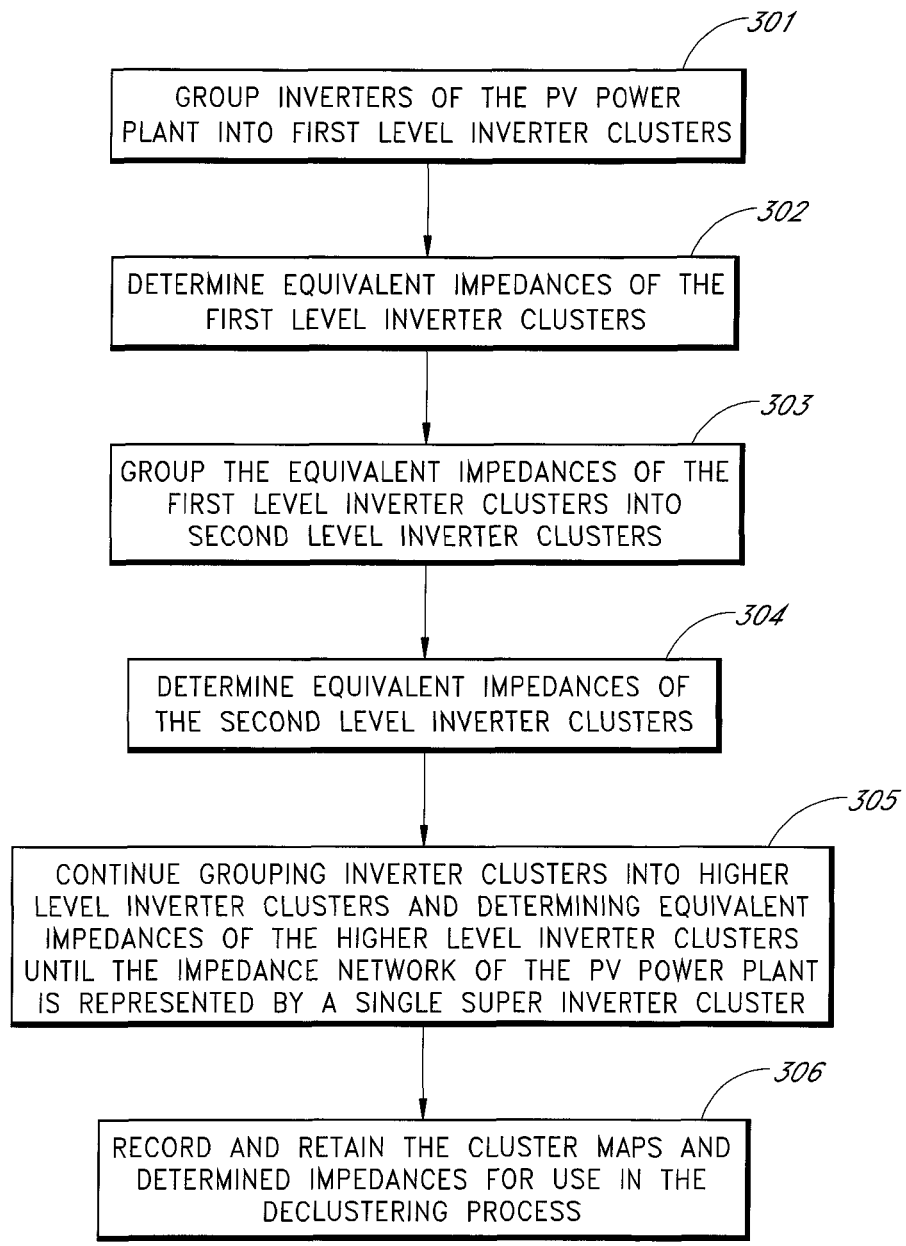
FIG. 8 is a flow diagram of a method of clustering a plurality of inverters to generate a single virtual inverter having an impedance representing the impedances of the plurality of inverters, in accordance with an embodiment of the present invention.
Figure 9:
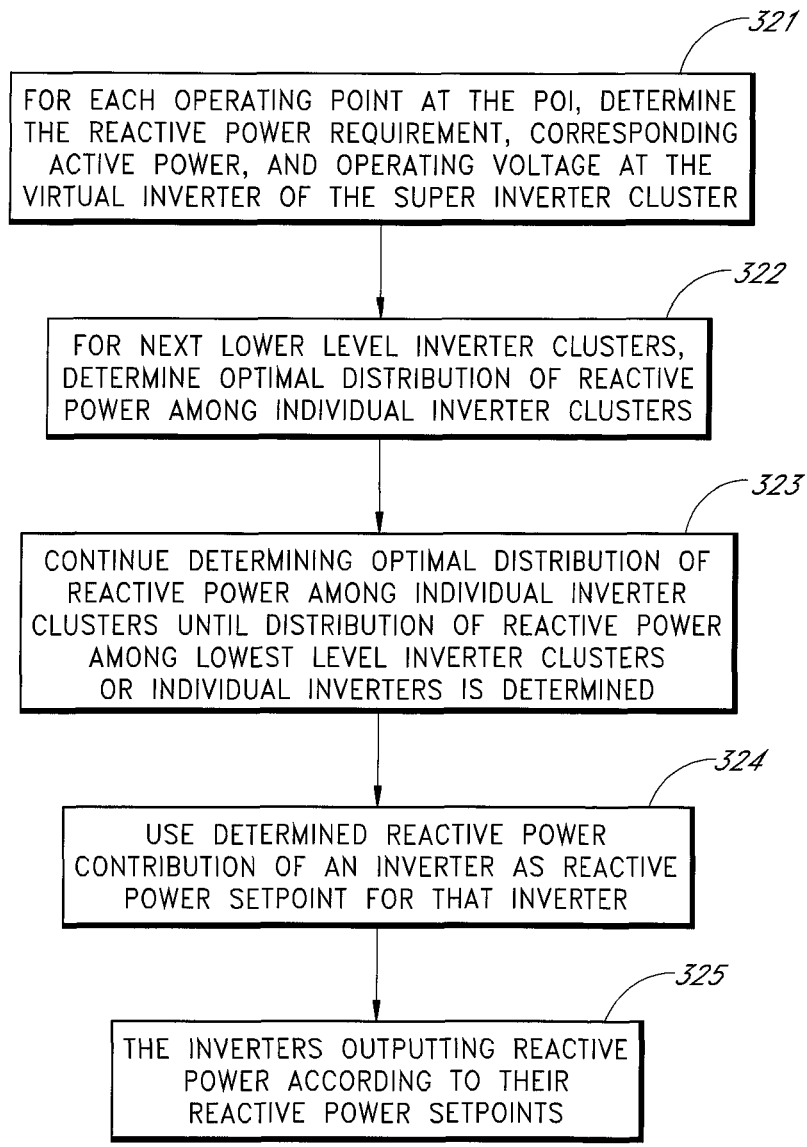
FIG. 9 is a flow diagram of a method of generating an optimized reactive power setpoint for a plurality of inverters of a photovoltaic power plant, in accordance with an embodiment of the present invention.
Figure 10:
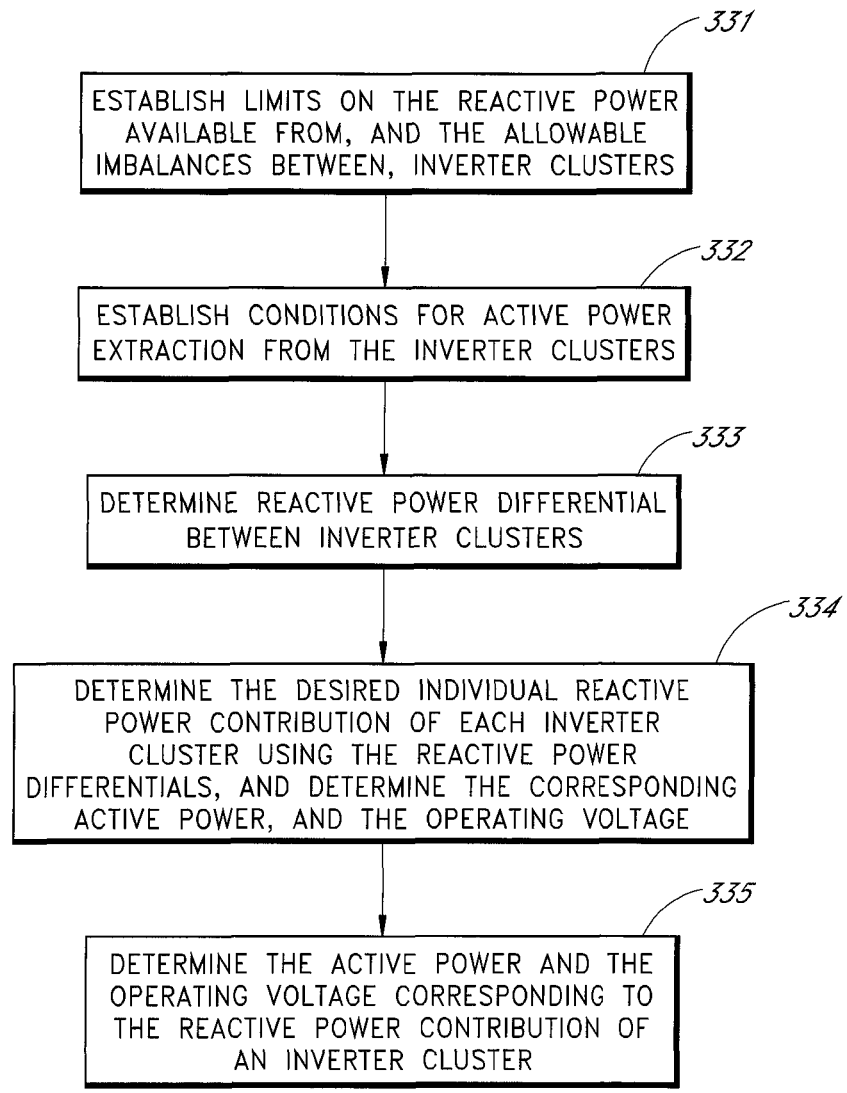
FIG. 10 is a flow diagram of a method of determining an optimum reactive power contribution of each of a plurality of inverters in accordance with an embodiment of the present invention.

FIG. 8 shows a flow diagram of a method of clustering a plurality of inverters 131 to generate a single virtual inverter having an impedance representing the impedances of the plurality of inverters 131, in accordance with an embodiment of the present invention. The method of FIG. 8 together with the methods of FIGS. 9 and 10 allow for optimized control of the photovoltaic inverters 131 of the photovoltaic power plant 100, for example. The methods of FIGS. 8-10 are explained with reference to the photovoltaic power plant 100 of FIG. 1 for illustration purposes only.

In the example of FIG. 8, the inverters 131 of the photovoltaic power plant 100 are grouped into first level inverter clusters (step 301). In the example of FIG. 8, inverters 131 having similar impedances may be grouped together to form a first level inverter cluster. The inverters 131 may be grouped together based on their location. For example, all inverters 131 in the inverter station 130-1 may be grouped together to form a first level inverter cluster, all inverters 131 in the inverter station 130-2 may be grouped together to form another first level inverter cluster, and so on.

An equivalent impedance is determined for each first level inverter cluster (step 302). The equivalent impedance of a first level inverter cluster represents the impedances of all inverters 131 and other line impedances, such impedances of associated transformers and transmission lines, in the first level inverter cluster.

The equivalent impedances of the first level inverter clusters are grouped into second level inverter clusters (step 303). A second level inverter cluster includes the equivalent impedances of first level inverter clusters included in the second level inverter cluster.

An equivalent impedance is determined for each second level inverter cluster (step 304). The equivalent impedance of a second level inverter cluster represents all of the equivalent impedances of first level inverter clusters in the second level inverter cluster.

The grouping of inverter clusters into higher level inverter clusters and determination of equivalent impedances of the higher level inverter clusters as in steps 301-304 is continued until a single inverter cluster, i.e., a super inverter cluster, representing a single virtual inverter that has a single equivalent impedance remains (step 305). The single equivalent impedance of the super inverter cluster represents the impedances of all inverters 131 and associated line impedances of the photovoltaic power plant 100. The inverter cluster maps and the determined impedances are retained for use in the following declustering process (step 306).

FIG. 9 is a flow diagram of a method of generating an optimized reactive power setpoint for each inverter 131 in the photovoltaic power plant 100, in accordance with an embodiment of the present invention.

The photovoltaic power plant 100 may be expected to provide different levels of reactive power for different active power levels at the POI 101. Each of the reactive power and the active power level is an operating point at the POI 101. For each operating point at the POI 101, the reactive power requirement and the operating voltage at the virtual inverter represented by the super inverter cluster is determined (step 321). As previously explained, the above-described inverter clustering method results in a super inverter cluster, representing a virtual inverter having a single equivalent impedance. The equivalent impedance of the super inverter cluster may be employed to calculate a corresponding reactive power and the operating voltage at the virtual inverter of the super inverter cluster (e.g., see discussions for equations EQ. 9 to EQ. 14).

For the next lower level inverter clusters, the reactive power contribution of individual inverter clusters is determined (step 322). For example, the reactive power contribution of next level inverter cluster just below the super inverter cluster may be determined by distributing the reactive power to be generated by the super inverter cluster among the next level inverter clusters (e.g., see discussions for equations EQ. 15 to EQ. 22). Given the reactive power to be generated by an inverter cluster, the corresponding operating voltage at the inverter cluster may be calculated.

The determination of distribution of reactive power among lower level inverter clusters continues until the reactive power contributions of the inverters 131 in the lowest level inverter cluster are determined (step 323). For example, once the reactive power to be generated by a virtual inverter represented by a first level inverter cluster is determined, generation of that reactive power is distributed among the inverters 131. That is, each inverter 131 in a first level inverter cluster is expected to generate reactive power such that the total reactive powers generated by the inverters 131 in that first level inverter cluster meet the reactive power to be generated by that first level inverter cluster. The determined reactive power contribution of an inverter 131 is then employed as the reactive power setpoint for that inverter 131 (step 324). The inverters 131 output reactive power in accordance with their reactive power setpoints (step 325).

FIG. 10 is a flow diagram of a method of determining an optimum reactive power contribution of each of a plurality of inverters in accordance with an embodiment of the present invention. The method of FIG. 10 may be employed to perform the step 322 of the method of FIG. 9.

In the example of FIG. 10, limits on the reactive power available from and the allowable imbalances between inverter clusters are determined (step 331). The limits on the reactive power may be based on the power rating of the inverters in the inverter cluster, and the prevailing active power production from the inverter cluster. Once the reactive power limit for the inverter clusters are determined, the allowable maximum differential, i.e., max delta, reactive power between the inverter clusters are then determined (e.g., see discussions for equations EQ. 15 to EQ. 19).

The conditions for active power extraction from the inverter clusters are determined (step 332). The conditions may be based on the prevailing active power production capability of the inverter clusters and associated solar cells (e.g., see discussions for equations EQ. 20 to EQ. 22).

The reactive power differential between inverter clusters is determined (step 333). The reactive power differential between inverter clusters may be determined based on the determined limits on reactive power, maximum reactive power differential between inverter clusters, and conditions for active power extraction from each inverter cluster determined in steps 331 and 332. The individual reactive power contribution of each inverter cluster is then determined using the reactive power differentials obtained in step 333 (step 334). The active power and operating voltage corresponding to the reactive power contribution of an inverter cluster is then determined (step 335). It is to be noted that at the lowest level, the "inverter cluster" is an inverter 131 of an inverter station 130. That is, once the process reaches a first level inverter cluster, the reactive power differential between inverters 131, etc. is determined.

The methods of FIGS. 8-10 result in a set of optimal reactive power contribution ($Q_{ijk}$ in FIG. 5) required from each lowest-level inverter cluster (or individual inverter 131) for each operating point at the POI 101. Typically the portion of the reactive power contribution from each lowest-level inverter cluster is a variable with a value dependent on the operating point at the POI 101. However, a single set of proportional and bias constant, or a multiple set of proportional and bias constants, encompassing the entire operating range, can be obtained for each lowest-level inverter cluster by using techniques such as piece-wise linearization or an inverter clustering technique of its own, similar to the one proposed above. For example, a weighted average of all the values can be obtained for multiple operating points, with the weights for averaging chosen based on the relative importance of the corresponding operating points. The use of a pre-determined set of proportional and bias constants for each lowest-level inverter cluster (rather than that of a variable dependent on the operating point at the POI 101) renders the resulting overall solution suboptimal, but significantly simplifies the control system design, facilitates systematic gain-scheduling during operation, and aids in ensuring stable operation of the overall system.

The results obtained from the methods of FIGS. 8-10 may be further refined through an iterative process, wherein first the individual active and reactive power contributions established from each lowest-level inverter cluster is used in a load flow study to assess overall reactive power performance at the POI 101, and the resulting voltage conditions at the various nodes including inverter terminals. The results of this assessment can be used to reestablish or refine the conditions for optimization and repeat the process.

While the desired proportion of reactive power contribution for individual lowest-level inverter cluster or inverter 131 is established off-line as described above, its implementation in the distributed control system may be achieved through the local interpreters 132. While the consolidated reactive power feedback signal for the overall system (represented by Q or PF in FIG. 1) is generated by the grid controller 110, the local interpreter 132 for each inverter station 130 scales, and adds bias to, this reactive power feedback signal in accordance with a predetermined scaling algorithm and generates the scaled and bias-added feedback signal, represented by Qn or PFn in FIG. 1.

Figure 11:
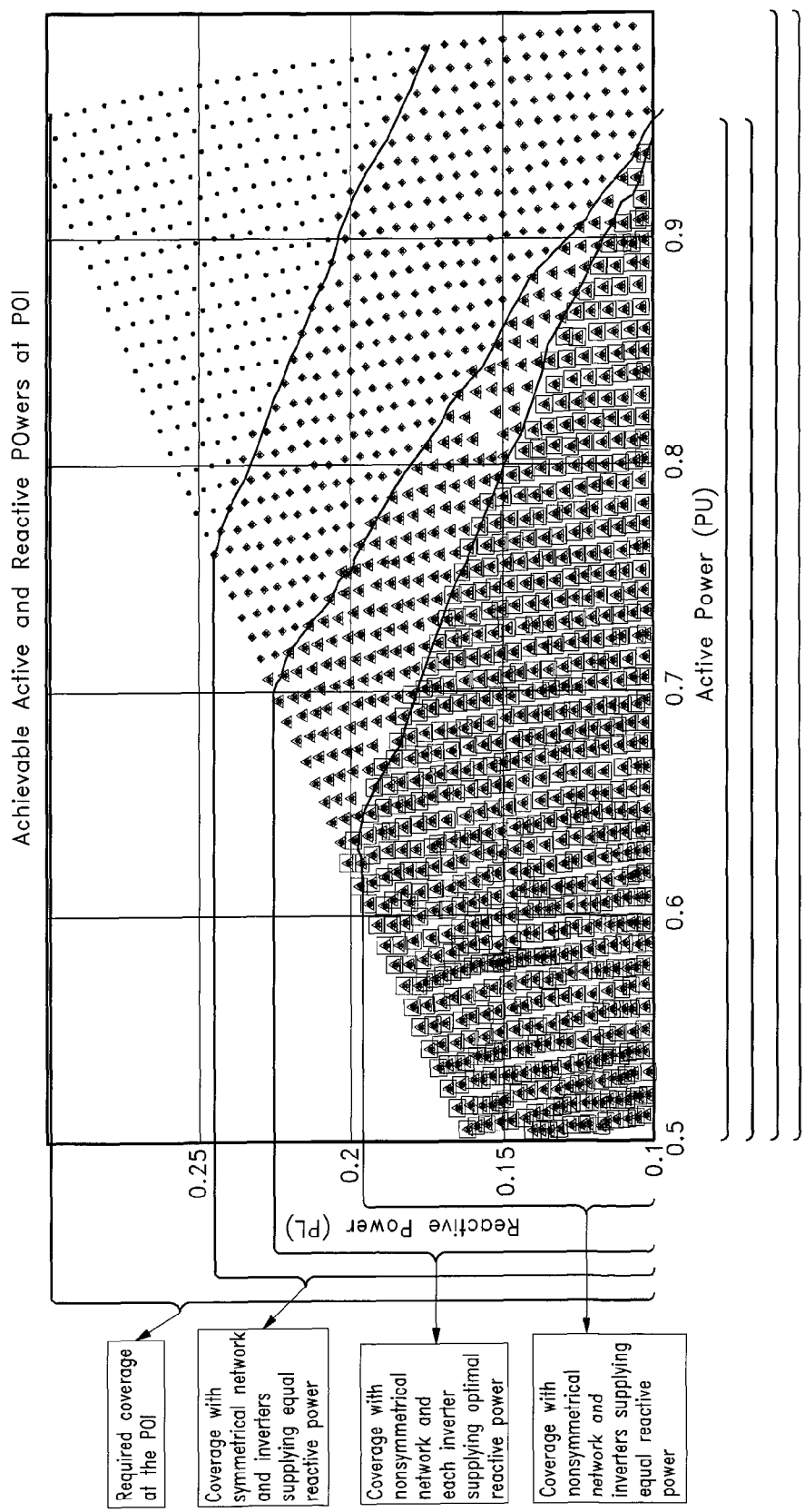
FIG. 11 shows plots resulting from modeling and calculations comparing various reactive power control techniques.

Using a typical example of a non-symmetrical large utility-scale system, detailed grid modeling and system dynamic simulation have been conducted by the inventors with and without the optimal reactive power control described herein. FIG. 11 shows plots (e.g., using MathCAD™ software tool) resulting from modeling and calculations comparing various reactive power control techniques. The plots illustrate the constraints of a non-optimal reactive power control in a non-symmetrical network as compared to an ideal symmetrical network. A symmetrical network is a photovoltaic power plant network, where all the individual inverter clusters have nearly the same equivalent impedance. In contrast, a non-symmetrical network is a photovoltaic power plant network where the individual and/or sub inverter clusters have significantly different equivalent impedances. The optimal reactive power control described herein significantly improves the power factor coverage at POI with non-symmetrical networks. The improved coverage can therefore reduce the capacity of ancillary reactive power devices such as switched capacitor banks or static VAR compensators by about 30% as needed otherwise.

The optimized reactive power control described herein provides an efficient solution to distribute the reactive power generation load among the many inverters of a photovoltaic power plant, providing the following benefits: (a) increased utility of the solar cells and improved overall system performance; (b) improved voltage control or support at the POI by the overall grid modeling and exploiting the inverter capabilities to the maximum; (c) improved power factor or reactive power control by minimizing the need for additional external capacitor banks or static VAR compensator equipment and minimizing line losses; and d) potential additional revenue earning for the solar cell system for providing the above services.

The optimal reactive power control ensures that the system effectively delivers the expected control range at the POI. It also ensures that the control dynamics of the distributed inverters can be successfully coordinated to provide the desired response at the POI, minimizing the need for additional protection systems or processes. In summary, the proposed grid control design presents the solar cell system as a single, directly controllable asset to the utility—similar to a traditional power plant, resulting in reduced hardware and interconnection costs.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of controlling operation of a photovoltaic power plant, the method comprising:
    grouping a plurality of inverters of the photovoltaic power plant into a plurality of first level inverter clusters;
    determining an equivalent impedance of each of the plurality of first level inverter clusters, the equivalent impedance of each of the plurality of first level inverter clusters representing impedances of inverters represented in each of the first level inverter clusters;
    grouping equivalent impedances of the first level inverter clusters into second level inverter clusters;
    determining an equivalent impedance of a super inverter cluster based at least on the equivalent impedances of the first level inverter clusters and second level inverter clusters, the equivalent impedance of the super inverter cluster representing impedances of inverters represented in the first level inverter clusters;
    determining a reactive power generated by a virtual inverter having the equivalent impedance of the super inverter cluster;
    determining a reactive power contribution of each of the inverters represented in the first level inverter clusters based on the reactive power generated by the virtual inverter; and
    an inverter represented in the first level inverter clusters generating a reactive power in accordance with a reactive power contribution determined for the inverter.

2. The method of claim 1 further comprising:
the inverter represented in the first level inverter clusters receiving a reactive power setpoint in accordance with the reactive power contribution determined for the inverter.

3. The method of claim 1 further comprising:
the inverter represented in the first level inverter clusters receiving the reactive power setpoint from a local interpreter.

4. The method of claim 3 further comprising:
the local interpreter generating the reactive power setpoint from a global reactive power setpoint received from a grid controller.

5. The method of claim 4 further comprising:
the local interpreter scaling the global reactive power setpoint to generate the reactive power setpoint.

* * * * *